Nov. 28, 1939.     G. G. LA GUE     2,181,458
COMBINATION FLOAT AND FISH LURE
Filed April 28, 1938
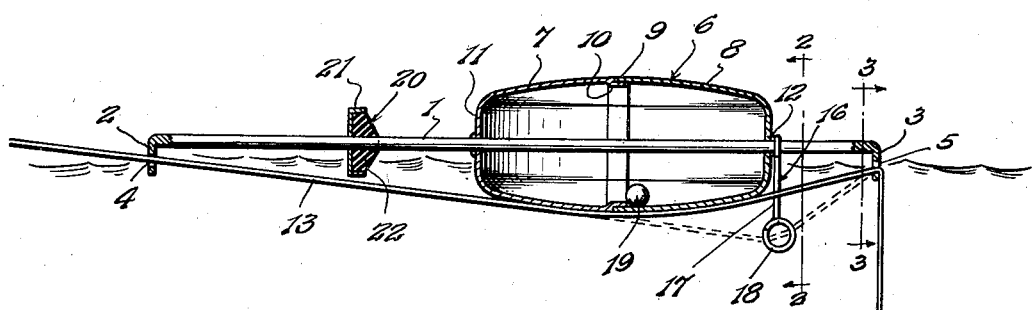
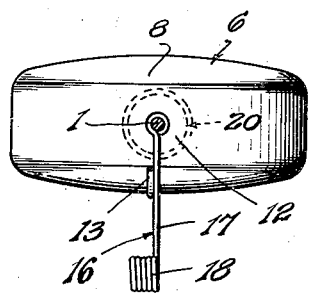
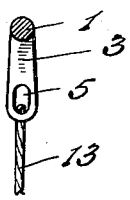
Inventor
George G. La Gue.
By Lacey & Lacey,
Attorneys Patented Nov. 28, 1939

2,181,458

UNITED STATES PATENT OFFICE 2,181,458

COMBINATION FLOAT AND FISH LURE

George G. La Gue, Fowler, Ind.

Application April 28, 1938, Serial No. 204,850

3 Claims. (Cl. 43—49)

This invention relates to an improved combination float and fish lure and seeks, among other objects, to provide a device of this character having means for producing musical sound waves when placed in the water for attracting fish.

A further object of the invention is to provide a combination float and fish lure wherein means are employed for warning the fisherman that his hook has been nibbled or struck by a fish.

Another object of the invention is to provide a combination float and fish lure which may be used either with a rod and reel for casting, or with an ordinary fishing pole for still fishing.

As a further object, the invention seeks to provide a combination float and fish lure wherein means are employed for removably securing the fish line to the float employed so that the hook may be disposed at any desired depth for still fishing.

Further objects of the invention will become apparent during the course of the following description.

My invention is illustrated in the accompanying drawing, wherein:

Figure 1 is a longitudinal sectional view, partly in elevation, showing the complete device.

Figure 2 is a vertical sectional view on the line 2—2 of Figure 1, looking in the direction indicated by the arrows.

Figure 3 is a fragmentary vertical sectional view on the line 3—3 of Figure 1, looking in the direction indicated by the arrows.

Referring now more particularly to the accompanying drawing, wherein like numerals of reference will be seen to designate like parts throughout the various views, the numeral 1 indicates the stem or needle of my improved combination float and fish lure. The stem is formed from a single piece of metal rod, of suitable diameter, which stem is flattened slightly at each end and bent down at right angles, as shown at 2 and 3. Apertures 4 and 5 are formed in the downwardly bent portions 2 and 3 for the reception of a fishing line, in a manner to be described in more detail hereinafter.

Fixed on the stem 1, near one end thereof, specifically the end thereof carrying the downwardly bent portion 3, is a float, indicated generally by the numeral 6. The float is hollow and substantially egg-shaped in outline, being formed of mating sections 7 and 8 which are connected by mating flanges 9 and 10, which flanges are soldered, sweated or otherwise secured together. The float is formed with substantially flat end walls 11 and 12 which are soldered or otherwise secured to the stem 1. Thus, it will be seen that the float is fixed to the stem and is not permitted to move longitudinally thereon. As shown at 13, a fishing line is trained through the aperture 4 and extends longitudinally of the stem 1 and lies against a portion of the float 6 and then extends through the aperture 5 from whence it is led to the hook, a conventional fish hook being shown at 14 and a lead sinker at 15.

In order to retain my improved combination float and fish lure in a desired set position on a fishing line when fishing in still water with a fishing pole, I employ a line holder 16. The line holder includes a shank 17 which is preferably soldered to the stem 1 adjacent the wall 12 of the float 6, said shank being disposed in the same vertical plane with the portions 2 and 3. The line holder includes a holding element 18 which is in the form of a coil spring, the line being adapted to be held between the coils of said holder, as shown in dotted lines in Figure 1.

Freely mounted in the float 6 is a metal ball 19 which may be an ordinary ball bearing or any other suitable spherical member. The ball 19 is permitted to roll and bounce freely within the float and, in use, will produce vibrating, rolling musical sounds which will be transmitted to the fish when the device is placed in the water.

In order to balance the float and stem in the water, I provide a balancing nut 20 which comprises a metal shell or coat 21 having a rubber insert 22 therein. The balancing nut is adapted to be positioned on the stem between the wall 11 and the portion 2 at any suitable spot and said nut will retain the float and stem in proper operative position in the water.

In operation, let us first presume that the device is to be used with a rod and reel for casting. After the line 13 has been trained through the aperture 4, partially about the float 6 and through the aperture 5, the sinker 15 is placed thereon and then the hook 14 is secured to the free end of the line. The hook is baited and the float is allowed to slide down the line until the portion 3 engages the upper end of the sinker 15. That is to say the float is moved as far as possible toward the free end of the line. When using rod and reel, the holder 16 is not employed. The line is cast and when the float strikes the water the line is released a few more feet from the reel so that said line will be permitted to slide through the apertures 4 and 5 and the hook allowed to sink to the desired depth.

If the device is to be used with a line suspended from an ordinary fishing pole, the line is trained through the aperture 4, through the coils of the holder 18, through the aperture 5, and then the sinker and hook are secured to said line. When using the device in this manner for "still" fishing, the line is dropped into the water and the hook will sink to the desired depth. The line will be prevented from paying out past the float by the holder 18, it being understood that a sufficient amount of line has been allowed to extend beyond the float and lure so that the hook will sink to the proper depth.

The function of the combination float and fish lure is the same, whether it be used with a rod and reel or with an ordinary fishing pole. That is to say, the rolling of the ball 19 in the float 6 will produce vibrating, rolling musical sound waves which will be conveyed to the hook through the wet line and will attract fish to the hook, it being well known that fish are provided with sensitive nerves which pick up sound waves. When the fish strikes the hook the line will, of course, be moved and the float will be caused to tilt rapidly downward in the water. When this takes place the ball will be caused to bounce within the float and strike the walls thereof for producing an audible sharp tinkling sound, thus warning the fisherman that his hook has been struck.

It should be understood that by varying the position of the nut 20, the float may be placed at any desired angle in the water. It should further be understood that the device may be used either with or without the ball 19. It is though that further description is unnecessary.

Having thus described the invention, what I claim is:

1. In a device of the class described, a stem having flattened end portions bent downwardly at right angles, said portions having apertures therein, a float on the stem, said stem being adapted to have a fishing line associated therewith, said fishing line being trained through the apertures, an adjusting nut carried on the stem and positioning the float and stem at a desired angle when in the water, means carried by the float and movable therein for producing vibrating, rolling musical sound waves to be transmitted through the fishing line to a hook at the end thereof, and means carried by the stem and removably engageable with the fishing line for preventing the fishing line from paying out along the device.

2. In a combination float and fish lure, a stem having downwardly turned portions formed with apertures, a float comprising companion mating sections having interengaging flanges connecting the sections, a sound producing element within the float, said stem being adapted to extend axially through the float and said float being adapted to be fixed against movement on the stem, a line holder carried on the stem, and a balancing nut carried on the stem, said balancing nut comprising a shell and a rubber insert, the device being adapted to have a fishing line trained through the opening and partially about the float and through the line holder, said element producing fish luring sounds when the device is in the water for transmission to the fishing hook on the end of the line, said line holder engaging the fishing line for retaining the line in proper position relative to the float.

3. In a device of the class described, a stem having downwardly turned portions formed with apertures to receive a fishing line therethrough, a hollow float carried on the stem, a balancing nut carried on the stem and being adapted to position the stem and float at a desired angle in the water, said balancing nut being of resilient material and being frictionally engageable with the stem, and a line holder carried by the stem and comprising a shank and a coil, said coil being adapted to engage the fishing line and retain said line in a desired position relative to the float and stem during a fishing operation.

GEORGE G. LA GUE.